United States Patent
Suhara et al.

(10) Patent No.: US 7,018,741 B2
(45) Date of Patent: Mar. 28, 2006

(54) PARTICULATE POSITIVE ELECTRODE ACTIVE MATERIAL FOR A LITHIUM SECONDARY CELL

(75) Inventors: Manabu Suhara, Kanagawa (JP); Naoshi Saito, Kanagawa (JP); Tsutomu Kato, Kanagawa (JP); Megumi Yukawa, Kanagawa (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 0 days.

(21) Appl. No.: 10/916,391

(22) Filed: Aug. 12, 2004

(65) Prior Publication Data

US 2005/0019662 A1    Jan. 27, 2005

Related U.S. Application Data

(63) Continuation of application No. PCT/JP03/01590, filed on Feb. 14, 2003.

(30) Foreign Application Priority Data

| Feb. 15, 2002 | (JP) | 2002-038974 |
| Apr. 10, 2002 | (JP) | 2002-107786 |

(51) Int. Cl.
*H01M 4/58* (2006.01)

(52) U.S. Cl. ............... 429/231.1; 429/231.3; 429/231.5; 429/231.6; 429/224; 429/221; 423/464

(58) Field of Classification Search ........... 429/231.1, 429/224, 231.3, 221, 231.5, 231.6; 423/464, 423/593.1, 594.1, 594.5, 595, 598, 599, 594.16, 423/600, 594.15, 594.8, 594.13, 594.9, 594.12
See application file for complete search history.

(56) References Cited

U.S. PATENT DOCUMENTS

| 6,569,569 | B1 * | 5/2003 | Kweon et al. | 429/231.1 |
| 6,749,965 | B1 * | 6/2004 | Kweon et al. | 429/231.1 |
| 2004/0023113 | A1 | 2/2004 | Suhara et al. | |
| 2004/0137325 | A1 | 7/2004 | Suhara et al. | |

FOREIGN PATENT DOCUMENTS

| JP | 7-033443 A | 2/1995 |
| JP | B-7-32017 B2 | 4/1995 |
| JP | 8-102332 A | 4/1996 |
| JP | 8-138670 A | 5/1996 |
| JP | 08-264183 A | 10/1996 |
| JP | 2855877 B2 | 11/1998 |
| JP | 11-317230 A | 11/1999 |
| JP | 2000-128539 * | 5/2000 |
| JP | 2000-128539 A | 5/2000 |
| JP | 3141858 B2 | 12/2000 |
| JP | 2002-124262 A | 4/2002 |
| JP | 2002-184402 A | 6/2002 |
| WO | WO 2004/030125 | 4/2004 |
| WO | WO 2004/030126 | 4/2004 |
| WO | WO 2004/051771 | 6/2004 |
| WO | WO 2004/082046 | 9/2004 |
| WO | WO 2004/088776 | 10/2004 |
| WO | WO 2004/092073 | 10/2004 |
| WO | WO 2005/018027 A1 | 2/2005 |
| WO | WO 2005/028371 A1 | 3/2005 |

OTHER PUBLICATIONS

"Electronic Conduction in Oxides", Tsuda et al, Springer Series in solid-state sciences (1993, published by Shokabo), p. 25, the Periodic Table 2-1.

* cited by examiner

*Primary Examiner*—Laura Weiner
(74) *Attorney, Agent, or Firm*—Oblon, Spivak, McClelland, Maier & Neustadt, P.C.

(57) ABSTRACT

A particulate positive electrode active material for a lithium secondary cell which satisfies high charge and discharge cyclic durability, high safety, high temperature storage properties, a high discharge average voltage, large current discharge properties, a high weight capacity density, a high volume capacity density, etc. in a well-balanced manner is provided. A particulate positive electrode active material for a lithium secondary cell, which is represented by the formula $Li_pCo_xM_yO_zF_a$ (wherein M is at least one element selected from Groups 2 to 8, 13 and 14 of the Periodic Table, $0.9 \leq p \leq 1.1$, $0.980 \leq x \leq 0.9999$, $0.0001 \leq y \leq 0.02$, $1.9 \leq z \leq 2.1$, $0.9 \leq x+y \leq 1$ and $0.0001 \leq a \leq 0.02$), wherein fluorine atoms and element M are unevenly distributed on the particle surface, the atomic ratio of fluorine atoms to cobalt atoms (a/x) is from 0.0001 to 0.02, and in powder X-ray diffraction using CuKα-ray, the half value width of the angle of diffraction on (110) plane is from 0.06 to 0.13°, and the half value width of the angle of diffraction on (003) plane is from 0.05 to 0.12°.

14 Claims, No Drawings

US 7,018,741 B2

PARTICULATE POSITIVE ELECTRODE ACTIVE MATERIAL FOR A LITHIUM SECONDARY CELL

BACKGROUND OF THE INVENTION

1. Field of the Invention

The present invention relates to a particulate positive electrode active material for a lithium secondary cell which favorably satisfies characteristics such as high charge and discharge cyclic durability, high safety, high temperature storage properties, a high discharge average voltage, large current discharge properties, a high weight capacity density and a high volume capacity density.

2. Discussion of Background

Recently, as the portability and cordless tendency of various electronic equipment have progressed, a demand for a non-aqueous electrolytic secondary cell which is small in size and light in weight and has a high energy density, has been increasingly high, and development of a non-aqueous electrolytic secondary cell having excellent characteristics has been desired more than ever before.

In general, a positive electrode active material employed for a non-aqueous electrolytic secondary cell comprises a composite oxide comprising lithium as the main active material and a transition metal represented by cobalt, nickel or manganese solid-solidified in lithium. Electrode characteristics such as the electric capacity, the reversibility, the operation voltage and the safety very depending upon the type of the transition metal to be used.

For example, non-aqueous electrolytic secondary cells employing an R-3m rhombohedral bedded-salt composite oxide having cobalt or nickel solid-solidified therein, such as $LiCoO_2$ or $LiNi_{0.8}Co_{0.2}O_2$, for the positive electrode active material, provide relatively high capacity densities of from 140 to 160 mAh/g and from 180 to 200 mAh/g, respectively, and provide favorable reversibility at a high voltage region of from 2.5 to 4.3 V. However, when such a cell is heated, the cell is likely to generate heat due to the reaction of the positive electrode active material and an electrolytic solvent at the time of charging.

JP-B-7-32017 discloses a positive electrode active material for a lithium secondary cell, having a part of Co in the composite oxide of $LiCoO_2$ replaced with Ti, Nb or Ta to improve cyclic discharge properties. Further, Japanese Patent No. 2855877 discloses a positive electrode active material for a lithium secondary cell, having a part of Co in the composite oxide of $LiCoO_2$ replaced with Zr to improve cyclic discharge properties. It is true that the cyclic discharge properties improve with these positive electrode active materials for a secondary cell, however, the safety tends to decrease, and the capacity tends to decrease also, such being unsatisfactory.

Further, Japanese Patent No. 3141858 discloses a positive electrode active material for a lithium secondary cell comprising a composite oxide of $Li_aM_bO_cX_d$ (wherein M is at least one member of Cr, Mn, Fe and Co, and X is a halogen such as fluorine). A positive electrode of such a composite oxide is considered to provide favorable characteristics such as cyclic properties and storage stability even at a temperature of at least 50° C. However, of the positive electrode comprising such a positive electrode active material, although the cyclic durability improves or the storage stability improves, on the other hand, the initial capacity density and the discharge average voltage tend to decrease, and the large current discharge properties are unsatisfactory, and further improvement has been desired.

As described above, among conventional positive electrode active material for a lithium secondary cell, no positive electrode active material which satisfies characteristics such as high safety, high charge and discharge cyclic durability, high temperature storage properties, a high discharge average voltage, large current discharge properties, a high weight capacity density and a high volume capacity density in a well-balanced manner, has been obtained.

It is an object of the present invention to provide a particulate positive electrode active material for a lithium secondary cell, which favorably satisfies characteristics such as high safety, high charge and discharge cyclic durability, high storage properties, a high discharge average voltage, large current discharge properties, a high weight capacity density and a high volume capacity density in a well-balanced manner.

SUMMARY OF THE INVENTION

To achieve the above object, the present inventors have conducted extensive studies and as a result, found that when a specific amount of a specific metal element and a specific amount of fluorine are simultaneously added to a particulate positive electrode active material comprising lithium cobalt oxide as a main body for a lithium secondary cell, characteristics of the obtained lithium secondary cell, such as high charge and discharge cyclic durability, high safety, high temperature storage properties, a high discharge average voltage, large current discharge properties, a high weight capacity density and a high volume capacity density are synergistically increased and are provided in a well-balanced manner as compared with a case where they are separately added.

Some of the above-described prior arts disclose to add fluorine to a particulate positive electrode active material so as to improve charge and discharge cyclic properties of the positive electrode. However, in this case, although the charge and discharge cyclic properties improve, the discharge capacity per weight remarkably decreases, such being unpractical. In the present invention, the cyclic durability and other characteristics improve without such a substantial decrease of the discharge capacity.

The mechanism why the above excellent characteristics can be obtained in a well-balanced manner in the present invention is not necessarily clear, however, it is estimated that the above specific metal element is present on the surface of lithium cobalt oxide particles, thus the surface of the positive electrode particles is covered with a coating of e.g. an oxide of the metal, whereby fluorine is more likely to be unevenly distributed on the surface of the positive electrode particles, and replacement of oxygen atoms of the lithium cobalt oxide lattice of the positive electrode with fluorine atoms is less likely to take place. On the other hand, in the above-described prior arts, it is considered to be one reason that a part of added fluorine replaces oxygen atoms of the lithium cobalt oxide lattice, thus the amount of cobalt atoms capable of participating in the charge and discharge decreases, and as a result, the discharge capacity remarkably decreases.

Namely, the particulate positive electrode active material for a lithium secondary cell of the present invention is characterized as follows.

(1) A particulate positive electrode active material for a lithium secondary cell, which is represented by the formula $Li_pCo_xM_yO_zF_a$ (wherein M is at least one element selected from Groups 2 to 8, 13 and 14 of the Periodic Table, $0.9 \leq p \leq 1.1$, $0.980 \leq x \leq 0.9999$, $0.0001 \leq y \leq 0.02$, $1.9 \leq z \leq 2.1$, $0.9 \leq x+y \leq 1$ and $0.0001 \leq a \leq 0.02$), wherein fluorine atoms and element M atoms are unevenly distributed on the particle surface, the atomic ratio of fluorine atoms to cobalt atoms (a/x) is from 0.0001 to 0.02, and in powder X-ray diffraction using CuKα-ray, the half value width of the angle of diffraction on (110) plane is from 0.06 to 0.13°, and the half value width of the angle of diffraction on (003) plane is from 0.05 to 0.12°.

(2) The particulate positive electrode active material for a lithium secondary cell according to (1), wherein no crystalline metal fluoride detectable by means of an X-ray diffraction method is present on the particle surface.

(3) The particulate positive electrode active material for a lithium secondary cell according to (1) or (2), wherein the fluorine atoms are unevenly distributed within 100 nm from the particle surface, and the element M atoms are unevenly distributed within 100 nm from the particle surface.

(4) The particulate positive electrode active material for a lithium secondary cell according to (1), (2) or (3), wherein at least a part of the fluorine atoms is a solid solution replaced with oxygen atoms in the interior of the particles, and at least a part of the element M atoms is a solid solution which replaces cobalt atoms in the interior of the particles.

(5) The particulate positive electrode active material for a lithium secondary cell according to any one of (1) to (4), wherein the element M is at least one member selected from Zr, Ti, V, Nb, Ge, Sn, Al, In, Y, Mo, W, Ga, Mg, Cr, Mn and Fe.

(6) The particulate positive electrode active material for a lithium secondary cell according to any one of (1) to (5), wherein when the element M is bivalent, trivalent or tetravalent, the ion radius of the element M is from 0.3 to 0.9 Å.

(7) A process for producing the particulate positive electrode active material for a lithium secondary cell as defined in any one of (1) to (6), which comprises firing a mixture of at least one member selected from an element M-containing oxide, an element M-containing hydroxide and an element M-containing oxyhydroxide, lithium fluoride, and cobalt hydroxide, cobalt oxyhydroxide or cobalt oxide, and lithium carbonate, at from 600 to 1050° C. in an oxygen-containing atmosphere for from 1 to 48 hours.

(8) A process for producing the particulate positive electrode active material for a lithium secondary cell as defined in any one of (1) to (6), which comprises firing a mixture of an element M-containing fluoride, and cobalt hydroxide, cobalt oxyhydroxide or cobalt oxide, and lithium carbonate, at from 600 to 1050° C. in an oxygen-containing atmosphere for from 1 to 48 hours.

(9) A process for producing the particulate positive electrode active material for a lithium secondary cell as defined in any one of (1) to (6), which comprises firing a mixture of at least one member selected from an element M-containing oxide, an element M-containing hydroxide element, an M-containing oxyhydroxide and an element M-containing fluoride, lithium fluoride (except for a case where an element M-containing fluoride is used), cobalt hydroxide and/or cobalt oxyhydroxide formed by agglomeration of a large number of primary particles, and lithium carbonate, at from 600 to 1050° C. in an oxygen-containing atmosphere for from 1 to 48 hours.

Now, the present invention will be explained in further detail.

DETAILED DESCRIPTION OF THE PREFERRED EMBODIMENTS

As mentioned above, the particulate positive electrode active material for a lithium secondary cell of the present invention has a formula of $Li_pCo_xM_yO_zF_a$. In such a formula, M, p, x, y, z and a are as defined above. Among them, p, x, y, z and a are preferably as follows: $0.97 \leq p \leq 1.03$, $0.990 \leq x \leq 0.999$, $0.001 \leq y \leq 0.01$, $1.95 \leq z \leq 2.05$, $0.95 \leq x+y \leq 1$ and $0.0002 \leq a \leq 0.01$. a is particularly preferably from 0.0005 to 0.008 in view of development of cell performance.

Further, the element M is at least one member of elements of Groups 2 to 8, 13 and 14 of the Periodic Table. The element of Group 2 of the Periodic Table may, for example, be Be, Mg, Ca, Sr or Ba. The element of Group 3 of the Periodic Table may, for example, be Sc, Y, a lanthanoid element or an actinoid element. The element of Group 4 of the Periodic Table may, for example, be Ti, Zr or Hf. The element of Group 5 of the Periodic Table may, for example, be V, Nb or Ta. The element of Group 6 of the Periodic Table may, for example, be Cr, Mo or W. The element of Group 7 of the Periodic Table may, for example, be Mn, Tc or Re. The element of Group 8 of the Periodic Table may, for example, be Fe, Ru or Os. The element of Group 13 of the Periodic Table may, for example, be B, Al, Ga, In or Tl. The element of Group 14 of the Periodic Table may, for example, be Si, Ge, Sn or Pb.

Among them, the element M is preferably an element having an ion radius of from 0.3 to 0.9 Å, particularly from 0.4 to 0.8 Å, when it is bivalent, trivalent or tetravalent. The ion radius of the element M is disclosed in "Electronic Conduction in Oxides", Nobuo Tsuda et al, Springer Series in solid-state sciences (1993, published by Shokabo), page 25, the Periodic Table 2-1. In the case of such elements, the above effect of improving cell characteristics are sufficiently provided. This is considered to be because with an element having such properties, the cobalt atoms on the crystal surface of lithium cobalt oxide can undergo stable replacement. Among such elements M, particularly preferred is at least one member selected from Mg, Sc, Ti, Zr, Hf, V, Nb, Ta, Cr, Mo, W, Mn, Fe, Al, Ga, In, Ge and Sn. Namely, when the element M is at least one member selected from Zr, Ti, V, Nb, Ge and Sn, such characteristics are obtained that the safety is relatively high, the charge and discharge cyclic durability is excellent, and the discharge properties and the discharge voltage are high particularly at a large current. Among them, Zr is particularly preferred since both the weight capacity density (mAh/g) and the volume capacity density (which is proportional to the positive electrode powder density) can be made high, in addition to the above characteristics. Further, when the element M is at least one member selected from Al, In, Y, Mo, W, Ga, Mg, Cr, Mn and Fe, such characteristics are obtained that the charge and discharge cyclic durability is good, particularly decrease in the initial weight capacity is small, and the safety is particularly high. Among them, Mg and Al are particularly preferred since such characteristics are obtained that the safety is high while the charge and discharge cyclic durability is remarkably high, and the volume capacity density is high also. Further, the positive electrode active material of the present invention has such a characteristic also that the volume development ratio after the secondary cell is stored at a high temperature is high. Here, the positive electrode active material of the present invention may contain another element within a range not impairing its characteristics.

The positive electrode active material for a lithium secondary cell of the present invention is preferably in a spherical particulate form, and the average particle size is preferably from 2 to 15 μm, particularly preferably from 3 to 9 μm. If the average particle size is smaller than 2 μm, formation of a dense electrode layer tends to be difficult, and if it exceeds 15 μm, formation of a smooth electrode layer surface tends to be difficult, such being unfavorable.

It is required of the particulate positive electrode active material of the present invention that fluorine atoms and the element M atoms are substantially unevenly distributed on the particle surface. In other words, it is required that substantially no fluorine atoms or element M is present in the inetrior of the particles. In such a case, since the fluorine atoms and the element M are locally present on the surface of the positive electrode active material, effects can be provided by addition of an extremely small amount. The effects of the present invention can not be obtained when they are present in the interior. In a case where fluorine atoms and the element M are added to the interior in order to obtain the effects of the present invention such as high safety, high cyclic durability, the large current discharge properties and the high temperature storage stability, addition of a large amount is necessary. When they are added in a large amount, decrease in the initial capacity, decrease in the large current discharge properties, decrease in the high temperature storage stability, etc. may be brought about on the contrary. Particularly, fluorine atoms are unevenly distributed preferably within 100 nm, particularly preferably within 30 nm from the particle surface. Further, the element M atoms are unevenly distributed preferably within 100 nm, particularly preferably within 30 nm from the particle surface. It is preferred that a part of fluorine atoms unevenly distributed on the particle surface of the positive electrode active material is a solid-solution replaced with oxygen atoms in the interior of the particles, and a part of the element M atoms is a solid-solution which replace cobalt atoms in the interior of the particles. In such a case, the cobalt and oxygen atoms on the particle surface of the positive electrode active material are not exposed, the effect of adding the elements is more likely to be obtained, such being favorable. Resultingly, the safety, the charge and discharge cyclic durability, the large current discharge properties, the high temperature storage properties, etc. are effectively improved.

It was found that preferably no crystalline metal fluoride detectable by means of an X-ray diffraction method is present on the particle surface of the particulate positive electrode active material of the present invention in view of characteristics. If such a crystalline metal fluoride is present, the initial capacity tends to decrease, such being unfavorable.

The atomic ratio of fluorine atoms to cobalt atoms (a/x) contained in the particulate positive electrode active material of the present invention is important since it has influence over the initial capacity, the safety, the charge and discharge cyclic durability, the large current discharge properties and the high temperature storage properties of the positive electrode active material, and it was found that its range is required to be from 0.0001 to 0.02. If the atomic ratio is smaller than 0.0001, the effect of improving the safety and the effect of improving the charge and discharge cyclic durability tend to decrease, such being unfavorable. On the other hand, if it exceeds 0.02, decrease in the initial capacity tends to be remarkable, such being unfavorable. Particularly, the atomic ratio of fluorine atoms to cobalt atoms is preferably from 0.0002 to 0.01, particularly preferably from 0.0005 to 0.008.

Further, it is required of the particulate positive electrode active material of the present invention that in powder X-ray diffraction using CuKα-ray, the half value width of the angle of diffraction on (110) plane is from 0.06 to 0.13°, and the half value width of the angle of diffraction on (003) plane is from 0.05 to 0.12°. It was found that in such a case, excellent characteristics can be obtained in view of the initial volume capacity density, the initial weight capacity density, the initial charge and discharge efficiency and the cyclic durability. On the other hand, if the above half value width on (110) plane is smaller than 0.06°, the large current discharge properties tend to decrease. On the contrary, if it exceeds 0.12°, the cyclic durability tends to decrease. Particularly, the half value width on (110) plane is preferably from 0.07 to 0.12°. Further, if the above half value width on (003) plane is smaller than 0.05°, the large current discharge properties tend to decrease. On the contrary, if it exceeds 0.12°, the cyclic durability tends to decrease. Particularly, the half value width on (003) plane is preferably from 0.06 to 0.11°.

Further, the particulate positive electrode active material of the present invention preferably has a press density of from 2.7 to 3.3 g/cm$^3$. If the press density is smaller than 2.7 g/cm$^3$, when a positive electrode sheet is formed by means of the particulate positive electrode active material, the initial volume capacity density of the positive electrode tends to be low, and on the contrary, if it is higher than 3.3 g/cm$^3$, the initial weight capacity density of the positive electrode tends to decrease, or the high-rate discharge properties tend to decrease, such being unfavorable. Particularly, the press density of the particulate positive electrode active material is preferably from 2.9 to 3.2 g/cm$^3$. In the present invention, it is preferred to use, as the cobalt material, substantially spherical cobalt oxyhydroxide in the form of secondary particles formed by agglomeration of a large number of primary particles, so that the press density can be increased. Here, the press density is a numerical value obtained from the volume and the powder weight when a powder is pressed under a pressure of 0.32 t/cm$^2$.

Further, the specific surface area of the particulate positive electrode active material of the present invention is preferably from 0.2 to 1 m$^2$/g. If the specific surface area is smaller than 0.2 m$^2$/g, the discharge capacity per initial unit weight tends to decrease, and on the contrary, if it exceeds 1 m$^2$/g also, the discharge capacity per initial unit volume tends to decrease, and no excellent positive electrode active material which is the object of the present invention can be obtained. The specific surface area is particularly preferably from 0.3 to 0.7 m$^2$/g.

The method for producing the particulate positive electrode active material of the present invention is not particularly limited, and it can be produced by a known method. For example, as the cobalt. material, cobalt hydroxide, tricobalt tetraoxide or cobalt oxyhydroxide is used. Among them, cobalt oxyhydroxide or cobalt hydroxide is preferred since high cell performance can be obtained. Particularly preferred is cobalt oxyhydroxide and/or cobalt hydroxide, of which secondary particles are formed by agglomeration of a large number of primary particles. As such a material, one of which the primary particle size is from 0.3 to 5 μm and from 30 to 200 primary particles of which are agglomerated to form a secondary particle may, for example, be mentioned. When such a material is used, the press density of the positive electrode powder can be increased, and as a result, the volume capacity density can be increased. As the material of the element M, an oxide, a hydroxide, a chloride, a nitrate, an organic salt, an oxyhydroxide or a fluoride is preferred, and among them, a hydroxide, an oxyhydroxide or a fluoride is preferred since high cell performance is likely to be obtained. As the lithium material, lithium carbonate or lithium hydroxide is preferred. Further, as the fluorine material, lithium fluoride, aluminum fluoride or magnesium fluoride is preferred. A mixture of these material substances, preferably a mixture of at least one member selected from an element M-containing oxide, an element M-containing hydroxide and an element M-containing oxyhydroxide, lithium fluoride, and cobalt hydroxide, cobalt oxyhydroxide or cobalt oxide, and lithium carbonate is fired in an oxygen-containing atmosphere at from 600 to 1050° C., preferably from 850 to 1000° C. for preferably from 1 to 48 hours, particularly preferably from 4 to 20 hours, to convert the mixture to a composite oxide. Further, when an element M-containing fluoride is used instead of the element M-containing compound and lithium fluoride, favorable cell performance can be obtained.

As the oxygen-containing atmosphere, use of an oxygen-containing atmosphere having an oxygen concentration of preferably at least 10 vol %, particularly preferably at least 40 vol %, is preferred. With the composite oxide, the above essentialities of the present invention can be satisfied by changing the type of the materials, the mixing composition and firing conditions. Further, in the present invention, preliminary firing may be carried out. It is preferred to carry out the preliminary firing in an oxidizing atmosphere preferably at from 450 to 550° C. preferably for from 1 to 20 hours.

Further, production of the positive electrode active material of the present invention is not necessarily limited to the above process, and it may be produced, for example, by preparing a positive electrode active material employing a metal fluoride, oxide and/or hydroxide as a material, followed by a surface treatment by means of a fluorinating agent such as fluorine gas, $NF_3$ or HF.

The method to obtain a positive electrode for a lithium secondary cell from the particulate positive electrode active material of the present invention may be carried out in accordance with a conventional method. For example, a carbon type conductive material such as acetylene black, graphite or Ketjenblack and a binding material are mixed with a powder of the positive electrode active material of the present invention to form a positive electrode mixture. As the binding material, polyvinylidene fluoride, polytetrafluoroethylene, polyamide, carboxymethyl cellulose or acrylic resin may, for example, be used. A slurry having the above positive electrode mixture dispersed in a dispersion medium such as N-methylpyrrolidone is coated and dried on a positive electrode current collector such as aluminum foil, followed by press rolling, to form a positive electrode active material layer on the positive electrode current collector.

With respect to a lithium cell using the positive electrode active material of the present invention for the positive electrode, as a solvent of the electrolytic solution, a carbonic ester is preferred. As the carbonic ester, each of a cyclic type and a chain type can be used. As the cyclic carbonic ester, propylene carbonate or ethylene carbonate (EC) may, for example, be mentioned. As the chain carbonic ester, dimethyl carbonate, diethyl carbonate (DEC), ethyl methyl carbonate, methyl propyl carbonate or methyl isopropyl carbonate may, for example, be mentioned.

The carbonic ester may be used alone or by mixing at least two types. Further, it may be used by mixing with another solvent. Further, according to the material of the negative electrode active material, if the chain carbonic ester is used together with the cyclic carbonic ester, there is a case where the discharge properties, the cyclic durability or the charge and discharge efficiency can be improved. Further, to such an organic solvent, a vinylidene fluoride-hexafluoropropylene copolymer (for example, KYNAR manufactured by ELF Atochem) or a vinylidene fluoride-perfluoropropyl vinyl ether copolymer may be added and the following solute may be added to obtain a gel polymer electrolyte.

As the solute of the electrolytic solution, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. For the electrolytic solution or the polymer electrolyte, it is preferred to add the electrolyte comprising a lithium salt to the solvent or the solvent-containing polymer at a concentration of from 0.2 to 2.0 mol/L. If the concentration departs from this range, ionic conductivity will decrease, and the electrical conductivity of the electrolyte will decrease. More preferably, it is from 0.5 to 1.5 mol/L. For the separator, a porous polyethylene or a porous propylene film may be used.

The negative electrode active material of the lithium cell using the positive electrode active material of the present invention for the positive electrode is a material which can occlude and discharge lithium ions. The material forming the negative electrode active material is not particularly limited, however, lithium metal, a lithium alloy, a carbon material, an oxide comprised of, as main body, a metal of Group 14 or Group 15 of the Periodic Table, a carbon compound, a silicon carbide compound, a silicone oxide compound, titanium sulfide or a boron carbide compound may, for example, be mentioned.

As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used.

The shape of the lithium secondary cell using the positive electrode active material of the present invention is not particularly limited. Sheet (so-called film), folding, winding type cylinder with bottom or button shape etc. is selected according to use.

Now, the present invention will be explained with reference to specific Examples 1 to 24 and Comparative Examples 1 to 8. However, the present invention is by no means restricted to such specific Examples.

In the following Examples and Comparative Examples, of the positive electrode active material powder, the specific surface area was obtained by means of a nitrogen adsorption method, and the average particle size was obtained by means of a laser scattering type particle size distribution meter.

EXAMPLE 1

A tricobalt tetraoxide powder, a lithium carbonate powder, a zirconium oxide powder and a lithium fluoride powder were mixed in predetermined amounts. After dry mixing of these four types of powders, the mixture was fired for 12 hours at 960° C. in the air atmosphere. The powder after firing was subjected to wet dissolution, contents of cobalt, zirconium, fluorine and lithium were measured by means of ICP, a fluoride ion electrode and atomic absorption analysis and as a result, the composition of the powder was $LiCo_{0.995}Zr_{0.005}O_{1.9929}F_{0.0071}$, and the F/Co atomic ratio was 0.0071.

With respect to the powder (positive electrode active material powder) after firing, an X-ray diffraction spectrum was obtained by means of RINT 2100 model X-ray diffraction device manufactured by Rigaku Industrial Corporation. As the measuring conditions, the voltage was 40 KV, the current was 40 mA, the sampling width was 0.004°, the scanning rate was 0.5°/min and the receiving slit was 0.15 mm. In the powder X-ray diffraction using CuKα-ray, the half value width of a diffraction peak on (110) plane in the vicinity of 2θ=66.5±1° was 0.090°, and the half value width of a diffraction peak on (003) plane in the vicinity of 2θ=18.8±1° was 0.082°.

Further, in the X-ray diffraction spectrum of the powder, no spectrum of a crystalline metal fluoride attributable to lithium fluoride was detected. Of the powder, the specific surface area was 0.31 m$^2$/g, and the average particle size D50 was 13.8 μm. As a result of XPS analysis of the surface of the powder after firing, a strong 3p signal derived from Zr and a strong F1 s signal derived from fluorine were detected. The press density of the powder was 2.88 g/cm$^3$.

Further, with respect to the sample subjected to washing with water, XPS surface analysis was carried out and as a result, a 3p signal derived from Zr was detected, however, a F1 s signal derived from fluorine was slightly detected, and it was found that most of the fluorine atoms on the surface were removed by washing with water.

Further, with respect to the sample after washing with water, sputterings were carried out under conditions of 10 minutes and 20 minutes, and then XPS analysis was carried out, whereupon no F1 s signal derived from fluorine was detected. These sputterings correspond to surface etchings with depths of about 30 nm and about 60 nm, respectively. Further, with respect to particles before washing with water, after sputtering of 10 minutes, the signal of Zr by means of XPS was attenuated to 12% of the signal before the sputtering, and it was found that Zr was unevenly distributed on the particle surface.

The $LiCo_{0.995}Zr_{0.005}O_{1.9929}F_{0.0071}$ powder thus obtained, acetylene black and a polytetrafluoroethylene powder were mixed in a weight ratio of 80/16/4, kneaded while adding toluene, and dried to prepare a positive electrode plate having a thickness of 150 μm.

Then, an aluminum foil having a thickness of 20 μm was used as the positive electrode current collector, a porous polypropylene having a thickness of 25 μm was used as the separator, a metal lithium foil having a thickness of 500 μm was used as the negative electrode, 20 μm of a nickel foil was used as the negative electrode current collector, and 1 M $LiPF_6$/EC+DEC (1:1) was used as the electrolytic solution, to assemble two pieces of simplifying sealed cells made of stainless steel in an argon globe box.

These two cells were charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. With respect to one cell, the charge and discharge cycle test was further carried out 30 times. Further, with respect to the other cell employing the EC+DEC (1:1) solution as the electrolytic solution, the other cell was charged for 10 hours at 4.3 V, and then broken down in the argon globe box. The positive electrode body sheet was picked up after charge, and after the positive electrode body sheet was washed, it was punched out at a radius of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged product was 175° C. Further, the initial discharge capacity at 25° C. at from 2.5 to 4.3 V at a discharge rate of 0.25 C was 158.2 mAh/g, the average discharge voltage at a discharge rate of 1.5 C was 3.872 V, and the capacity retention ratio after 30 times of charge and discharge cycle, was 98.6%.

EXAMPLE 2

A positive electrode active material powder was prepared in the same manner as in Example 1 except that a titanium oxide powder was used instead of zirconium oxide, and composition analysis and physical property measurement of the positive electrode active material powder and cell performance tests were carried out. As a result, the composition of the powder was $LiCo_{0.995}Ti_{0.005}O_{1.9926}F_{0.0074}$, and the F/Co atomic ratio was 0.0074.

In X-ray diffraction of this powder, the half value width of a diffraction peak on (110) plane in the vicinity of 2θ=66.5±1° was 0.116°, and the half value width of a diffraction peak on (003) plane in the vicinity of 2θ=18.8±1° was 0.100°. Further, in the X-ray diffraction spectrum of the powder, no spectrum of a crystalline metal fluoride attributable to lithium fluoride was detected. Of the powder after filing, the specific surface area was 0.35 m$^2$/g, and the average particle size D50 was 12.2 μm. As a result of XPS analysis of the surface of the powder, a strong Ti2p signal derived from titanium and a strong F1 s signal derived from fluorine were detected. The press density of the positive electrode active material powder was 2.79 g/cm$^3$.

Further, with respect to the sample subjected to washing with water, XPS surface analysis was carried out and as a result, a Ti2p signal derived from titanium was detected, however, a F1 s signal derived from fluorine was slightly detected, and it was found that most of the fluorine atoms on the surface were removed by washing with water.

Further, with respect to the sample after washing with water, sputterings were carried out under conditions of 10 minutes and 20 minutes, and then XPS analysis was carried out, whereupon no F1 s signal derived from fluorine was detected. These sputterings correspond to surface etchings with depths of about 30 nm and about 60 nm, respectively. Further, with respect to particles before washing with water, after sputtering of 10 minutes, the signal of titanium by means of XPS was attenuated to 13% of the signal before the sputtering, and it was found that titanium was unevenly distributed on the particle surface.

The $LiCo_{0.995}Ti_{0.005}O_{1.9926}F_{0.0074}$ powder thus obtained, acetylene black and a polytetrafluoroethylene powder were mixed in a weight ratio of 80/16/4, kneaded while adding toluene, and dried to prepare a positive electrode plate having a thickness of 150 μm.

The heat generation starting temperature of a 4.3 V charged product of the positive electrode active material powder was 175° C. Further, the initial discharge capacity at 25° C. at from 2.5 to 4.3 V at a discharge rate of 0.25 C was 156.2 mAh/g, the average discharge voltage at a discharge rate of 1.5 C was 3.890 V, and the capacity retention ratio after 30 times of charge and discharge cycle, was 99.3%.

EXAMPLE 3

A positive electrode active material powder was prepared in the same manner as in Example 1 except that niobium oxide was used instead of zirconium oxide, and its composition analysis and physical property measurement, and cell performance tests were carried out. As a result, the composition of the powder was $LiCo_{0.995}Nb_{0.005}O_{1.9928}F_{0.0072}$, and the F/Co atomic ratio was 0.0072. Further, in powder X-ray diffraction using CuKα-ray, the half value width of a diffraction peak on (110) plane in the vicinity of 2θ=66.5±1° was 0.085°, and the half value width of a diffraction peak on (003) plane in the vicinity of 2θ=18.8±1° was 0.064°. The press density of the powder was 2.85 g/cm$^3$.

Further, in the X-ray diffraction spectrum of the powder, no spectrum of a crystalline metal fluoride attributable to lithium fluoride was detected. Of the powder after firing, the specific surface area was 0.34 m$^2$/g, and the average particle size D50 was 14.4 μm. Fluorine and niobium were unevenly distributed on the surface.

Of a 4.3 V charged product of the positive electrode active material powder, the heat generation starting temperature was 179° C. The initial discharge capacity at 25° C. at from 2.5 to 4.3 V at a discharge rate of 0.25 C was 156.6 mAh/g, the average discharge voltage at a discharge rate of 1.5 C was 3.876 V, and the capacity retention ratio after 30 times of charge and discharge cycle was 97.4%.

EXAMPLE 4

A positive electrode active material was prepared in the same manner as in Example 1 except that aluminum oxide was used instead of zirconium oxide, and its composition analysis and physical property measurement, and cell performance tests were carried out. As a result, the composition was $LiCo_{0.995}Al_{0.005}O_{1.9927}F_{0.0073}$, and the F/Co atomic ratio was 0.0073. Further, in powder X-ray diffraction using CuKα-ray, the half value width of a diffraction peak on (110) plane in the vicinity of 2θ=66.5±1° was 0.075°, and the half value width of a diffraction peak on (003) plane in the vicinity of 2θ=18.8±1° was 0.064°. The press density of the powder was 2.89 g/cm$^3$.

Further, in the X-ray diffraction spectrum of the powder, no spectrum of a crystalline metal fluoride attributable to lithium fluoride was detected. Of the powder after firing, the specific surface area was 0.27 m$^2$/g, and the average particle size D50 was 14.3 μm. As a result of XPS analysis of the surface of the powder, a strong 2 s signal derived from Al and a strong F1 s signal derived from fluorine were detected.

Further, with respect to the sample after washing with water, sputterings were carried out under conditions of 10 minutes and 20 minutes, and then XPS analysis was carried out, whereupon no F1 s signal derived from fluorine was detected. These sputterings correspond to surface etchings with depths of about 30 nm and about 60 nm, respectively. Further, with respect to particles before washing with water, after sputtering of 10 minutes, the signal of Al by means of XPS was attenuated to 15% of the signal before the sputtering, and it was found that Al was unevenly distributed on the particle surface. Further, fluorine and aluminum were unevenly distributed on the surface.

The heat generation starting temperature of a 4.3 V charged product of the positive electrode active material powder was 175° C. The initial discharge capacity at 25° C. at from 2.5 to 4.3 V at a discharge rate of 0.25 C was 158.3 mAh/g, the average discharge voltage at a discharge rate of 1.5 C was 3.866 V, and the capacity retention ratio after 30 times of charge and discharge cycle, was 99.3%. After a storage test for 30 days at 60° C. of the 4.3 V charged cell, the capacity development ratio of the cell was 93%.

EXAMPLE 5

A positive electrode active material was prepared in the same manner as in Example 1 except that yttrium oxide was used instead of zirconium oxide, and its composition analysis and physical property measurement, and cell performance tests were carried out. As a result, the composition was $LiCo_{0.995}Y_{0.005}O_{1.9930}F_{0.0070}$, and the F/Co atomic ratio was 0.0070. Further, in powder X-ray diffraction using CuKα-ray, the half value width of a diffraction peak on (110) plane in the vicinity of 2θ=66.5±1° was 0.085°, and the half value width of a diffraction peak on (003) plane in the vicinity of 2θ=18.8±1° was 0.092°. The press density of the powder was 2.85 g/cm$^3$.

Further, in the X-ray diffraction spectrum of the powder, no spectrum of a crystalline metal fluoride attributable to lithium fluoride was detected. Of the powder after firing, the specific surface area was 0.28 m$^2$/g, and the average particle size D50 was 15.1 μm. Fluorine and yttrium were unevenly distributed on the surface.

Of a 4.3 V charged product of the positive electrode active material powder, the heat generation starting temperature was 185° C. The initial discharge capacity at 25° C. at from 2.5 to 4.3 V at a discharge rate of 0.25 C was 160.9 mAh/g, the average discharge voltage at a discharge rate of 1.5 C was 3.845 V, and the capacity retention ratio after 30 times of charge and discharge cycle was 99.5%. After a storage test for 30 days at 60° C. of the 4.3 V charged cell, the capacity development ratio of the cell was 91%.

EXAMPLE 6

A positive electrode active material was prepared in the same manner as in Example 1 except that tungsten oxide was used instead of zirconium oxide, and composition analysis and physical property measurement of the positive electrode active material powder, and cell performance tests were carried out. As a result, the composition was $LiCo_{0.995}W_{0.005}O_{1.9927}F_{0.0073}$, and the F/Co atomic ratio was 0.0073. Further, in powder X-ray diffraction using CuKα-ray, the half value width of a diffraction peak on (110) plane in the vicinity of 2θ=66.5±1° was 0.084°, and the half value width of a diffraction peak on (003) plane in the vicinity of 2θ=18.8±1° was 0.076°. The press density of the powder was 2.87 g/cm$^3$.

Further, in the X-ray diffraction spectrum of the powder, no spectrum of a crystalline metal fluoride attributable to lithium fluoride was detected. Of the powder after firing, the specific surface area was 0.46 m$^2$/g, and the average particle size D50 was 12.2 μm. Fluorine and tungsten were unevenly distributed on the surface.

Of a 4.3 V charged product of the positive electrode active material powder, the heat generation starting temperature was 174° C. The initial discharge capacity at 25° C. at from 2.5 to 4.3 V at a discharge rate of 0.25 C was 156.3 mAh/g, the average discharge voltage at a discharge rate of 1.5 C was 3.880 V, and the capacity retention ratio after 30 times of charge and discharge cycle was 96.7%.

EXAMPLE 7

A positive electrode active material was prepared in the same manner as in Example 1 except that molybdenum oxide was used instead of zirconium oxide, and composition analysis and physical property measurement of the positive electrode active material powder, and cell performance tests were carried out. As a result, the composition was $LiCo_{0.995}Mo_{0.005}O_{1.9926}F_{0.0074}$, and the F/Co atomic ratio was 0.0074. Further, in powder X-ray diffraction using CuKα-ray, the half value width of a diffraction peak on (110) plane in the vicinity of 2θ=66.5±1° was 0.080°, and the half value width of a diffraction peak on (003) plane in the vicinity of 2θ=18.8±1° was 0.075°. The press density of the powder was 2.88 g/cm³.

Further, in the X-ray diffraction spectrum of the powder, no spectrum of a crystalline metal fluoride attributable to lithium fluoride was detected. Of the powder after firing, the specific surface area was 0.29 m²/g, and the average particle size D50 was 13.3 μm. Fluorine and molybdenum were unevenly distributed on the surface.

Of a 4.3 V charged product of the positive electrode active material powder, the heat generation starting temperature was 187° C. The initial discharge capacity at 25° C. at from 2.5 to 4.3 V at a discharge rate of 0.25 C was 158.0 mAh/g, and the average discharge voltage at a discharge rate of 1.5 C was 3.871 V. After a storage test for 30 days at 60° C. of the 4.3 V charged cell, the capacity development ratio of the cell was 90%.

EXAMPLE 8

A positive electrode active material was prepared in the same manner as in Example 1 except that indium oxide was used instead of zirconium oxide, and its composition analysis and physical property measurement, and cell performance tests were carried out. As a result, the composition was $LiCo_{0.995}In_{0.005}O_{1.9926}F_{0.0074}$, and the F/Co atomic ratio was 0.0074. Further, in powder X-ray diffraction using CuKα-ray, the half value width of a diffraction peak on (110) plane in the vicinity of 2θ=66.5±1° was 0.080°, and the half value width of a diffraction peak on (003) plane in the vicinity of 2θ=18.8±1° was 0.075°. The press density of the powder was 2.87 g/cm³.

Further, in the X-ray diffraction spectrum of the powder, no spectrum of a crystalline metal fluoride attributable to lithium fluoride was detected. Of the powder after firing, the specific surface area was 0.29 m²/g, and the average particle size D50 was 13.3 μm. Fluorine and indium were unevenly distributed on the surface.

Of a 4.3 V charged product of the positive electrode active material powder, the heat generation starting temperature was 179° C. The initial discharge capacity at 25° C. at from 2.5 to 4.3 V at a discharge rate of 0.25 C was 158.6 mAh/g, and the average discharge voltage at a discharge rate of 1.5 C was 3.865 V.

EXAMPLE 9

A positive electrode active material was prepared in the same manner as in Example 1 except that vanadium oxide was used instead of zirconium oxide, and its composition analysis and physical property measurement, and cell performance tests were carried out. As a result, the composition was $LiCo_{0.995}V_{0.005}O_{1.9929}F_{0.0071}$, and the F/Co atomic ratio was 0.0071. Further, in powder X-ray diffraction using CuKα-ray, the half value width of a diffraction peak on (110) plane in the vicinity of 2θ=66.5±1° was 0.078°, and the half value width of a diffraction peak on (003) plane in the vicinity of 2θ=18.8±1° was 0.067°. The press density of the powder was 2.88 g/cm³.

Further, in the X-ray diffraction spectrum of the powder, no spectrum of a crystalline metal fluoride attributable to lithium fluoride was detected. Of the powder, the specific surface area was 0.29 m²/g, and the average particle size D50 was 14.0 μm. Fluorine and vanadium were unevenly distributed on the surface.

Of a 4.3 V charged product of the positive electrode active material powder, the heat generation starting temperature was 178° C. The initial discharge capacity at 25° C. at from 2.5 to 4.3 V at a discharge rate of 0.25 C was 159.3 mAh/g, and the average discharge voltage at a discharge rate of 1.5 C was 3.860 V.

COMPARATIVE EXAMPLE 1

A positive electrode active material was prepared in the same manner as in Example 1 except that zirconium oxide and lithium fluoride were not used, and composition analysis and physical property measurement of the positive electrode active material powder and cell performance tests were carried out. As a result, the composition was $LiCoO_2$. Of the powder after firing, the specific surface area was 0.30 m²/g, and the average particle size D50 was 12.0 μm.

Of a 4.3 V charged product of the positive electrode active material powder, the heat generation starting temperature was 160° C. The initial discharge capacity at 25° C. at from 2.5 to 4.3 V at a discharge rate of 0.25 C was 160.9 mAh/g, and the average discharge voltage at a discharge rate of 1.5 C was 3.870 V. The capacity retention ratio after 30 times of charge and discharge cycle was 97.2%. After a storage test for 30 days at 60° C. of the 4.3 V charged cell, the capacity development ratio of the cell was 86%.

COMPARATIVE EXAMPLE 2

A positive electrode active material was prepared in the same manner as in Example 2 except that lithium fluoride was not used, and composition analysis and physical property measurement of the positive electrode active material powder and cell performance tests were carried out. As a result, the composition was $LiCo_{0.995}Ti_{0.005}O_2$. Of the powder after firing, the specific surface area was 0.28 m²/g, and the average particle size D50 was 14.5 μm.

Of a 4.3 V charged product of the positive electrode active material powder, the heat generation starting temperature was 155° C. The initial discharge capacity at 25° C. at from 2.5 to 4.3 V at a discharge rate of 0.25 C was 157.4 mAh/g, and the average discharge voltage at a discharge rate of 1.5 C was 3.880 V. The capacity retention ratio after 30 times of charge and discharge cycle was 98.6%. After a storage test for 30 days at 60° C. of the 4.3 V charged cell, the capacity development ratio of the cell was 75%.

COMPARATIVE EXAMPLE 3

A positive electrode active material was prepared in the same manner as in Example 2 except that the addition amount of lithium fluoride was changed, and composition analysis and physical property measurement of the positive electrode active material powder and cell performance tests were carried out. As a result, the composition was $LiCo_{0.995}Ti_{0.005}O_{1.95}F_{0.05}$, and the F/Co atomic ratio was 0.05. Further, in the X-ray diffraction spectrum of the powder, a spectrum of a crystalline metal fluoride attributable to lithium fluoride was detected. Of the powder after firing, the specific surface area was 0.32 m²/g, and the average particle size D50 was 12.9 μm.

Of a 4.3 V charged product of the positive electrode active material powder, the heat generation starting temperature was 175° C. The initial discharge capacity at 25° C. at from 2.5 to 4.3 V at a discharge rate of 0.25 C was 140.2 mAh/g, and the average discharge voltage at a discharge rate of 1.5 C was 3.881 V. The capacity retention ratio after 30 times of charge and discharge cycle was 98.5%.

EXAMPLE 10

A positive electrode active material was produced in the same manner as in Example 2 except that cobalt oxyhydroxide was used instead of tricobalt tetraoxide and the addition amount of lithium fluoride was changed. Of cobalt oxyhydroxide, from 50 to 120 primary particles having an average particle size of 0.8 μm were agglomerated to form a secondary particle having a substantially spherical shape. Of the obtained positive electrode active material, the composition was $LiCo_{0.995}Ti_{0.005}O_{1.9988}F_{0.0012}$, the F/Co atomic ratio was 0.0012, and the press density was 3.05 g/cm$^3$. Further, the positive electrode active material powder reflected the shape of the material cobalt source. Namely, a large number of primary particles which underwent crystal growth were agglomerated to form secondary particles having a substantially shape.

Of the positive electrode active material, in powder X-ray diffraction using CuKα-ray, the half value width of a diffraction peak on (110) plane in the vicinity of 2θ=66.5±1° was 0.112°, and the half value width of a diffraction peak on (003) plane in the vicinity of 2θ=18.8±1° was 0.097°. Further, of the powder after firing, the specific surface area was 0.38 m$^3$/g, and the average particle size was 12.6 μm. Of the positive electrode active material powder, the heat generation starting temperature was 175° C., the initial capacity was 160.2 mAh/g, the discharge average voltage at a discharge rate of 1.5 C was 3.886 V, and the charge and discharge cycle retention ratio was 98.9%.

Further, as a result of XPS analysis in the same manner as in Example 1, fluorine and titanium were unevenly discharged on the particle surface, and no crystalline metal fluoride was detected in the X-ray diffraction spectrum.

EXAMPLE 11

$LiCo_{0.990}Al_{0.010}O_{1.9930}F_{0.0070}$ was prepared in the same manner as in Example 4 except that aluminum hydroxide and aluminum fluoride were used instead of aluminum oxide and lithium fluoride. The F/Co atomic ratio was 0.0070.

Of the positive electrode active material, in powder X-ray diffraction using CuKα-ray, the half value width of a diffraction peak on (110) plane in the vicinity of 2θ=66.5±1° was 0.082°, and the half value width of a diffraction peak on (003) plane in the vicinity of 2θ=18.8±1° was 0.065°. The press density of the powder was 2.89 g/cm$^3$. Further, the specific surface area was 0.30 m$^2$/g, and the average particle size was 13.6 μm. Of the positive electrode active material powder, the heat generation starting temperature was 178° C., the initial capacity was 157.6 mAh/g, the discharge average voltage at a high rate was 3.860 V, the charge and discharge cycle retention ratio was 99.5%, and the capacity retention ratio after a 60° C. storage test was 94%.

Further, as a result of XPS analysis in the same manner as in Example 1, aluminum and fluorine were unevenly distributed on the surface.

EXAMPLE 12

A positive electrode active material was prepared in the same manner as in Example 1 except that magnesium hydroxide was used instead of zirconium oxide, and its composition analysis and physical property measurement and cell performance tests were carried out. As a result, the composition was $LiCo_{0.997}Mg_{0.003}O_{1.9973}F_{0.0027}$, and the F/Co atomic ratio was 0.0027. Further, in powder X-ray diffraction using CuKα-ray, the half value width of a diffraction peak on (110) plane in the vicinity of 2θ=66.5±1° was 0.080°, and the half value width of a diffraction peak on (003) plane in the vicinity of 2θ=18.8±1° was 0.087°. The press density of the powder was 2.89 g/cm$^3$.

Further, in the X-ray diffraction spectrum of the powder, no spectrum of a crystalline metal fluoride attributable to lithium fluoride was detected. Of the powder after firing, the specific surface area was 0.31 m$^2$/g, and the average particle size D50 was 12.9 μm. As a result of XPS analysis of the surface of the powder, a strong 2 s signal derived from Mg and a strong F1 s signal derived from fluorine were detected. With respect to the sample after washing with water, sputterings were carried out under conditions of 10 minutes and 20 minutes, and then XPS analysis was carried out, whereupon no F1 s signal derived from fluorine was detected. These sputterings correspond to surface etchings with depths of about 30 nm and about 60 nm, respectively. Further, with respect to particles before washing with water, after sputtering of 10 minutes, the signal of Mg by means of XPS was attenuated to 14% of the signal before the sputtering, and it was found that Mg was unevenly distributed on the particle surface.

The heat generation starting temperature of a 4.3 V charged product of the positive electrode active material powder was 190° C. The initial discharge capacity at 25° C. at from 2.5 to 4.3 V at a discharge rate of 0.25 C was 161.4 mAh/g, the average discharge voltage at a discharge rate of 1.5 C was 3.763 V, and the capacity retention ratio after 30 times of charge and discharge cycle, was 99.9%.

EXAMPLE 13

A positive electrode active material was prepared in the same manner as in Example 1 except that gallium hydroxide was used instead of zirconium oxide, and composition analysis and physical property measurement of the positive electrode active material powder and cell performance tests were carried out. As a result, the composition was $LiCo_{0.995}Ga_{0.005}O_{1.9981}F_{0.0019}$, and the F/Co atomic ratio was 0.0019. Further, in powder X-ray diffraction using CuKα-ray, the half value width of a diffraction peak on (110) plane in the vicinity of 2θ=66.5±1° was 0.070°, and the half value width of a diffraction peak on (003) plane in the vicinity of 2θ=18.8±1° was 0.058°. The press density of the powder was 2.88 g/cm$^3$.

Further, in the X-ray diffraction spectrum of the powder, no spectrum of a crystalline metal fluoride attributable to lithium fluoride was detected. Of the powder after firing, the specific surface area was 0.33 m$^2$/g, and the average particle size D50 was 13.7 μm. Fluorine and gallium were unevenly distributed on the surface. The heat generation starting temperature of a 4.3 V charged product of the positive electrode active material powder was 187° C. The initial discharge capacity at 25° C. at from 2.5 to 4.3 V at a discharge rate of 0.25 C was 158.3 mAh/g, the average discharge voltage at a discharge rate of 1.5 C was 3.838 V, and the capacity retention ratio after 30 times of charge and discharge cycle, was 97.4%.

EXAMPLE 14

A positive electrode active material was prepared in the same manner as in Example 1 except that magnesium fluoride was used instead of zirconium oxide and lithium fluoride, and composition analysis and physical property measurement of the positive electrode active material powder and cell performance tests were carried out. As a result, the composition was $LiCo_{0.9986}Mg_{0.0014}O_{1.9970}F_{0.0030}$, and the F/Co atomic ratio was 0.0030. Further, in powder X-ray diffraction using CuKα-ray, the half value width of a diffraction peak on (110) plane in the vicinity of $2θ=66.5±1°$ was 0.093°, and the half value width of a diffraction peak on (003) plane in the vicinity of $2θ=18.8±1°$ was 0.075°. The press density of the powder was 2.88 g/cm³.

Further, in the X-ray diffraction spectrum of the powder, no spectrum of a crystalline metal fluoride attributable to magnesium fluoride was detected. Of the powder after firing, the specific surface area was 0.31 m²/g, and the average particle size D50 was 13.5 μm. Fluorine and magnesium were unevenly distributed on the surface. The heat generation starting temperature of a 4.3 V charged product of the positive electrode active material powder was 195° C. The initial discharge capacity at 25° C. at from 2.5 to 4.3 V at a discharge rate of 0.25 C was 161.0 mAh/g, the average discharge voltage at a discharge rate of 1.5 C was 3.801 V, and the capacity retention ratio after 30 times of charge and discharge cycle, was 99.9%.

EXAMPLE 15

A positive electrode active material was prepared in the same manner as in Example 1 except that manganese hydroxide was used instead of zirconium oxide, and its composition analysis and physical property measurement and cell performance tests were carried out. As a result, the composition was $LiCo_{0.997}Mn_{0.005}O_{1.9945}F_{0.0055}$, and the F/Co atomic ratio was 0.0055. Further, in powder X-ray diffraction using CuKα-ray, the half value width of a diffraction peak on (110) plane in the vicinity of $2θ=66.5±1°$ was 0.075°, and the half value width of a diffraction peak on (003) plane in the vicinity of $2θ=18.8±1°$ was 0.070°. The press density of the powder was 2.86 g/cm³.

Further, in the X-ray diffraction spectrum of the powder, no spectrum of a crystalline metal fluoride attributable to lithium fluoride was detected. Of the powder after firing, the specific surface area was 0.37 m²/g, and the average particle size D50 was 12.6 μm. Fluorine and manganese were unevenly distributed on the surface. The heat generation starting temperature of a 4.3 V charged product of the positive electrode active material powder was 180° C. The initial discharge capacity at 25° C. at from 2.5 to 4.3 V at a discharge rate of 0.25 C was 157.2 mAh/g, the average discharge voltage at a discharge rate of 1.5 C was 3.879 V, and the capacity retention ratio after 30 times of charge and discharge cycle, was 98.1%.

EXAMPLE 16

A positive electrode active material was prepared in the same manner as in Example 1 except that chromium oxide was used instead of zirconium oxide, and composition analysis and physical property measurement of the positive electrode active material powder and cell performance tests were carried out. As a result, the composition was $LiCo_{0.995}Cr_{0.005}O_{1.9958}F_{0.0042}$, and the F/Co atomic ratio was 0.0042. Further, in powder X-ray diffraction using CuKα-ray, the half value width of a diffraction peak on (110) plane in the vicinity of $2θ=66.5±1°$ was 0.085°, and the half value width of a diffraction peak on (003) plane in the vicinity of $2θ=18.8±1°$ was 0.075°. The press density of the powder was 2.87 g/cm³.

Further, in the X-ray diffraction spectrum of the powder, no spectrum of a crystalline metal fluoride attributable to lithium fluoride was detected. Of the powder after firing, the specific surface area was 0.35 m²/g, and the average particle size D50 was 12.0 μm. Fluorine and chromium were unevenly distributed on the surface. The heat generation starting temperature of a 4.3 V charged product of the positive electrode active material powder was 175°C. The initial discharge capacity at 25°C. at from 2.5 to 4.3 V at a discharge rate of 0.25 C was 158.3 mAh/g, the average discharge voltage at a discharge rate of 1.5 C was 3.872 V, and the capacity retention ratio after 30 times of charge and discharge cycle, was 98.8%.

EXAMPLE 17

A positive electrode active material was prepared in the same manner as in Example 1 except that tin oxide was used instead of zirconium oxide, and its composition analysis and physical property measurement and cell performance tests were carried out. As a result, the composition was $LiCo_{0.995}Sn_{0.005}O_{1.9945}F_{0.0055}$, and the F/Co atomic ratio was 0.0055. Further, in powder X-ray diffraction using CuKα-ray, the half value width of a diffraction peak on (110) plane in the vicinity of $2θ=66.5±1°$ was 0.075°, and the half value width of a diffraction peak on (003) plane in the vicinity of $2θ=18.8±1°$ was 0.061°. The press density of the powder was 2.85 g/cm³.

Further, in the X-ray diffraction spectrum of the powder, no spectrum of a crystalline metal fluoride attributable to lithium fluoride was detected. Of the powder after firing, the specific surface area was 0.38 m²/g, and the average particle size D50 was 12.9 μm. Fluorine and tin were unevenly distributed on the surface. The heat generation starting temperature of a 4.3 V charged product of the positive electrode active material powder was 175° C. The initial discharge capacity at 25° C. at from 2.5 to 4.3 V at a discharge rate of 0.25 C was 159.9 mAh/g, the average discharge voltage at a discharge rate of 1.5 C was 3.833 V, and the capacity retention ratio after 30 times of charge and discharge cycle, was 98.0%.

EXAMPLE 18

A positive electrode active material was prepared in the same manner as in Example 1 except that germanium hydroxide was used instead of zirconium oxide, and composition analysis and physical property measurement of the positive electrode active material powder and cell performance tests were carried out. As a result, the composition was $LiCo_{0.995}Ge_{0.005}O_{1.9961}F_{0.0039}$, and the F/Co atomic ratio was 0.0039. Further, in powder X-ray diffraction using CuKα-ray, the half value width of a diffraction peak on (110) plane in the vicinity of $2θ=66.5±1°$ was 0.076°, and the half value width of a diffraction peak on (003) plane in the vicinity of $2θ=18.8±1°$ was 0.058°. The press density of the powder was 2.84 g/cm³.

Further, in the X-ray diffraction spectrum of the powder, no spectrum of a crystalline metal fluoride attributable to lithium fluoride was detected. Of the powder after firing, the specific surface area was 0.38 m²/g, and the average particle size D50 was 12.9 μm. Fluorine and germanium were unevenly distributed on the surface. The heat generation starting temperature of a 4.3 V charged product of the positive electrode active material powder was 174° C. The initial discharge capacity at 25° C. at from 2.5 to 4.3 V at a discharge rate of 0.25 C was 160.1 mAh/g, and the average discharge voltage at a discharge rate of 1.5 C was 3.831 V, and the capacity retention ratio after 30 times of charge and discharge cycle, was 98.2%.

EXAMPLE 19

A positive electrode active material was prepared in the same manner as in Example 1 except that iron hydroxide was used instead of zirconium oxide, and composition analysis and physical property measurement of the positive electrode active material powder and cell performance tests were carried out. As a result, the composition was $LiCo_{0.995}Fe_{0.005}O_{1.9957}F_{0.0043}$, and the F/Co atomic ratio was 0.0043. Further, in powder X-ray diffraction using CuKα-ray, the half value width of a diffraction peak on (110) plane in the vicinity of $2θ=66.5±1°$ was 0.085°, and the half value width of a diffraction peak on (003) plane in the vicinity of $2θ=18.8±1°$ was 0.075°. The press density of the powder was 2.83 g/cm$^3$.

Further, in the X-ray diffraction spectrum of the powder, no spectrum of a crystalline metal fluoride attributable to lithium fluoride was detected. Of the powder after firing, the specific surface area was 0.35 m$^2$/g, and the average particle size D50 was 12.9 μm. Fluorine and iron were unevenly distributed on the surface. The heat generation starting temperature of a 4.3 V charged product of the positive electrode active material powder was 180° C. The initial discharge capacity at 25° C. at from 2.5 to 4.3 V at a discharge rate of 0.25 C was 159.9 mAh/g, the average discharge voltage at a discharge rate of 1.5 C was 3.831 V, and the capacity retention ratio after 30 times of charge and discharge cycle, was 98.3%.

EXAMPLE 20

A positive electrode active material was prepared in the same manner as in Example 4 except that aluminum hydroxide was used instead of zirconium oxide and adding amounts of lithium fluoride and aluminum hydroxide were changed, and composition analysis and physical property measurement of the positive electrode active material powder and cell performance tests were carried out. The composition of the positive electrode active material was $LiCo_{0.998}Al_{0.002}O_{1.9981}F_{0.0019}$ and the F/Co atomic ratio was 0.0019. The half value width of a diffraction peak on (110) plane in the vicinity of $2θ=66.5±1°$ was 0.077°, and the half value width of a diffraction peak on (003) plane in the vicinity of $2θ=18.8±1°$ was 0.065°. The press density of the powder was 2.87 g/cm$^3$.

Further, in the X-ray diffraction spectrum of the powder, no spectrum of a crystalline metal fluoride attributable to lithium fluoride was detected. Of the powder after firing, the specific surface area was 0.30 m$^2$/g, and the average particle size D50 was 13.9 μm. Fluorine and aluminum were unevenly distributed on the surface. The heat generation starting temperature of a 4.3 V charged product of the positive electrode active material powder was 175° C. The initial discharge capacity at 25° C. at from 2.5 to 4.3 V at a discharge rate of 0.25 C was 160.2 mAh/g, the average discharge voltage at a discharge rate of 1.5 C was 3.851 V, and the capacity retention ratio after 30 times of charge and discharge cycle, was 99.1%.

EXAMPLE 21

A positive electrode active material was prepared in the same manner as in Example 2 except that the addition amount of lithium fluoride was changed, and its composition analysis and physical property measurement and cell performance tests were carried out. The press density of the powder was 2.80 g/cm$^3$. The composition of the positive electrode active material was $LiCo_{0.995}Ti_{0.005}O_{1.9983}F_{0.0017}$, and the F/Co atomic ratio was 0.0017. The half value width of a diffraction peak on (110) plane in the vicinity of $2θ=66.5±1°$ was 0.102°, and the half value width of a diffraction peak on (003) plane in the vicinity of $2θ=18.8±1°$ was 0.091°.

Further, in the X-ray diffraction spectrum of the powder, no spectrum of a crystalline metal fluoride attributable to lithium fluoride was detected. Of the powder after firing, the specific surface area was 0.32 m$^2$/g, and the average particle size D50 was 12.7 μm. Fluorine and titanium were unevenly distributed on the surface. The heat generation starting temperature of a 4.3 V charged product of the positive electrode active material powder was 175° C. The initial discharge capacity at 25° C. at from 2.5 to 4.3 V at a discharge rate of 0.25 C was 153.3 mAh/g, the average discharge voltage at a discharge rate of 1.5 C was 3.885 V, and the capacity retention ratio after 30 times of charge and discharge cycle, was 98.9%.

EXAMPLE 22

A positive electrode active material was prepared in the same manner as in Example 20 except that cobalt oxyhydroxide, of which a large number of primary particles were agglomerated to form secondary particles having a substantially spherical shape, was used instead of cobalt oxide, and the lithium fluoride addition amount was changed, and composition analysis and physical property measurement of the positive electrode active material powder and cell performance tests were carried out.

The composition of the positive electrode active material was $LiCo_{0.998}Al_{0.002}O_{1.9969}F_{0.0031}$, the F/Co atomic ratio was 0.0031, and the press density was 3.03 g/cm$^3$. Further, the positive electrode active material powder reflected the shape of cobalt oxyhydroxide as the material cobalt source, and a large number of primary particles were agglomerated to form secondary particles having a substantially spherical shape. The half value width of a diffraction peak on (110) plane in the vicinity of $2θ=66.5±1°$ was 0.094°, and the half value width of a diffraction peak on (003) plane in the vicinity of $2θ=18.8±1°$ was 0.080°.

Further, in the X-ray diffraction spectrum of the powder, no spectrum of a crystalline metal fluoride attributable to lithium fluoride was detected. Of the powder after firing, the specific surface area was 0.32 m$^2$/g, and the average particle size D50 was 12.5 μm. Fluorine and aluminum were unevenly distributed on the surface. The heat generation starting temperature of a 4.3 V charged product of the positive electrode active material powder was 179° C. The initial discharge capacity at 25° C. at from 2.5 to 4.3 V at a discharge rate of 0.25 C was 161.3 mAh/g, the average discharge voltage at a discharge rate of 1.5 C was 3.867 V, and the capacity retention ratio after 30 times of charge and discharge cycle, was 99.8%.

COMPARATIVE EXAMPLE 4

A positive electrode active material was prepared in the same manner as in Example 2 except that lithium fluoride addition amount was changed, and composition analysis and physical property measurement of the positive electrode active material powder and cell performance tests were carried out. The composition of the positive electrode active material was $LiCo_{0.995}Ti_{0.005}O_{1.970}F_{0.030}$, and the F/Co atomic ratio was 0.030. Of the powder after firing, the specific surface area was 0.35 m$^2$/g, and the average particle size D50 was 14.1 μm. The heat generation starting temperature of a 4.3 V charged product of the positive electrode active material powder was 174° C. The initial discharge capacity at 25° C. at from 2.5 to 4.3 V at a discharge rate of 0.25 C was 148.3 mAh/g, the average discharge voltage at a discharge rate of 1.5 C was 3.880 V, and the capacity retention ratio after 30 times of charge and discharge cycle, was 98.5%.

COMPARATIVE EXAMPLE 5

A positive electrode active material was prepared in the same manner as in Example 4 except that lithium fluoride addition amount was changed, and composition analysis and physical property measurement of the positive electrode active material powder and cell performance tests were carried out. The composition of the positive electrode active material was $LiCo_{0.995}Al_{0.005}O_{1.972}F_{0.028}$, and the F/Co atomic ratio was 0.028. Of the powder after firing, the specific surface area was 0.37 m$^2$/g, and the average particle size D50 was 13.5 μm. The heat generation starting temperature of a 4.3 V charged product of the positive electrode active material powder was 174° C. The initial discharge capacity at 25° C. at from 2.5 to 4.3 V at a discharge rate of 0.25 C was 147.5 mAh/g, the average discharge voltage at a discharge rate of 1.5 C was 3.841 V, and the capacity retention ratio after 30 times of charge and discharge cycle, was 99.2%.

COMPARATIVE EXAMPLE 6

A positive electrode active material was prepared in the same manner as in Example 5 except that lithium fluoride was not used, and its composition analysis and physical property measurement and cell performance tests were carried out. The composition of the positive electrode active material was $LiCo_{0.995}Y_{0.005}O_2$, and the F/Co atomic ratio was 0.0.

Of the powder after firing, the specific surface area was 0.30 m$^2$/g, and the average particle size D50 was 14.7 μm. The heat generation starting temperature of a 4.3 V charged product of the positive electrode active material powder was 154° C. The initial discharge capacity at 25° C. at from 2.5 to 4.3 V at a discharge rate of 0.25 C was 160.8 mAh/g, the average discharge voltage at a discharge rate of 1.5 C was 3.837 V, and the capacity retention ratio after 30 times of charge and discharge cycle, was 95.6%.

EXAMPLE 23

A positive electrode active material was produced in the same manner as in Example 1 except that cobalt oxyhydroxide was used instead of tricobalt tetraoxide, and the addition amount of lithium fluoride was changed. Of cobalt oxyhydroxide, from 50 to 120 primary particles having an average particle size of 0.8 μm were agglomerated to form a secondary particle having a substantially spherical shape. The obtained positive electrode active material had a composition of $LiCo_{0.995}Zr_{0.005}O_{1.9927}F_{0.0073}$, and its F/Co atomic ratio was 0.0073, and the press density was 3.10 g/cm$^3$. Further, the positive electrode active material powder reflected the shape of the material cobalt source. Namely, a large number of primary particles which underwent crystal growth were agglomerated to form secondary particles having a substantially spherical shape.

Of the positive electrode active material, in powder X-ray diffraction using CuKα-ray, the half value width of a diffraction peak on (110) plane in the vicinity of 2θ=66.5±1° was 0.093°, and the half value width of a diffraction peak on (003) plane in the vicinity of 2θ=18.8±1° was 0.085°. Further, the specific surface area was 0.33 m$^2$/g, the particle size was 12.9 μm, the heat generation starting temperature was 180° C., the initial capacity was 161.7 mAh/g, the average discharge voltage at a discharge rate of 1.5 C was 3.874 V, and the charge and discharge cycle retention ratio was 99.2%.

Further, as a result of XPS analysis in the same manner as in Example 1, fluorine and zirconium were unevenly distributed on the particle surface, and no crystalline metal fluoride was detected in the X-ray diffraction spectrum.

COMPARATIVE EXAMPLE 7

A positive electrode active material was prepared in the same manner as in Example 1 except that lithium fluoride was not used, and its composition analysis and physical property measurement and cell performance tests were carried out. As a result, the composition was $LiCo_{0.995}Zr_{0.005}O_2$.

Of the powder after firing, the specific surface area was 0.30 m$^2$/g, and the average particle size D50 was 14.1 μm. The heat generation starting temperature of a 4.3 V charged product was 160° C. The initial discharge capacity at 25° C. at from 2.5 to 4.3 V at a discharge rate of 0.25 C was 158.7 mAh/g, and the average discharge voltage at a discharge rate of 1.5 C was 3.871 V. The capacity retention ratio after 30 times of charge and discharge cycle, was 98.1%.

COMPARATIVE EXAMPLE 8

A positive electrode active material was prepared in the same manner as in Example 1 except that the addition amount of lithium fluoride was changed, and its composition analysis and physical property measurement and cell performance tests were carried out. As a result, the composition was $LiCo_{0.995}Zr_{0.005}O_{1.95}F_{0.05}$, and the F/Co atomic ratio was 0.05.

Further, in the X-ray diffraction spectrum of the powder, a spectrum of a crystalline metal fluoride attributable to lithium fluoride was detected. Of the powder after firing, the specific surface area was 0.31 m$^2$/g, and the average particle size D50 was 12.3 μm. The heat generation starting temperature of a 4.3 V charged product of the positive electrode active material powder was 175° C. The initial discharge capacity at 25° C. at from 2.5 to 4.3 V at a discharge rate of 0.25 C was 138.0 mAh/g, and the average discharge voltage at a discharge rate of 1.5 C was 3.870 V. The capacity retention ratio after 30 times of charge and discharge cycle, was 98.3%.

EXAMPLE 24

A positive electrode active material was produced in the same manner as in Example 1 except that cobalt hydroxide was used instead of tricobalt tetraoxide, and the addition amount of lithium fluoride was changed. Of cobalt hydroxide, from 60 to 200 primary particles of 0.6 μm were agglomerated to form a secondary particle having a substantially spherical shape. The obtained positive electrode active material had a composition of $LiCo_{0.995}Zr_{0.005}O_{1.9975}F_{0.0025}$, its F/Co atomic ratio was 0.0025, and the press density was 3.23 g/cm$^3$. Further, the positive electrode active material powder basically reflected the shape of the material cobalt source. Namely, a large number of primary particles, while they underwent crystal growth, were agglomerated to form secondary particles having a substantially spherical shape.

Of the positive electrode active material, in powder X-ray diffraction using CuKα-ray, the half value width of a diffraction peak on (110) plane in the vicinity of 2θ=66.5±1° was 0.097°, and the half value width of a diffraction peak on (003) plane in the vicinity of 2θ=18.8±1° was 0.092°. Further, of the powder after firing, the specific surface area was 0.34 m$^2$/g, the particle size was 13.7 μm. Of the positive electrode active material powder, the heat generation starting temperature was 178° C., the initial capacity was 161.5 mAh/g, the average discharge voltage at a discharge rate of 1.5 C was 3.876 V, and the charge and discharge cycle retention ratio was 99.4%.

Further, as a result of XPS analysis in the same manner as in Example 1, fluorine and zirconium were unevenly distributed on the particle surface, and no crystalline metal fluoride was detected in the X-ray diffraction spectrum.

According to the present invention, a particulate positive electrode active material for a lithium secondary cell which satisfies high charge and discharge cyclic durability, high safety, high temperature storage properties, a high discharge average voltage, large current discharge properties, a high weight capacity density, a high volume capacity density, etc. in a well-balanced manner can be provided.

The entire disclosures of Japanese Patent Application No. 2002-038974 filed on Feb. 15, 2002 and Japanese Patent Application No. 2002-107786 filed on Apr. 10, 2002 including specifications, claims and summaries are incorporated herein by reference in their entireties.

What is claimed is:

1. A particulate positive electrode active material for a lithium secondary cell, which is represented by the formula $Li_pCo_xM_yO_zF_a$ (wherein M is at least one element selected from Groups 2 to 8, 13 and 14 of the Periodic Table, 0.9≦p≦1.1, 0.980≦x≦0.9999, 0.0001≦y≦0.02, 1.9≦z≦2.1, 0.9≦x+y≦1 and 0.0001≦a≦0.02), wherein fluorine atoms and element M atoms are unevenly distributed on the particle surface, the atomic ratio of fluorine atoms to cobalt atoms (a/x) is from 0.0001 to 0.008, and in powder X-ray diffraction using CuKα-ray, the half value width of the angle of diffraction on (110) plane is from 0.06 to 0.13°, and the half value width of the angle of diffraction on (003) plane is from 0.05 to 0.12° and wherein no crystal metal fluoride detectable by an X-ray diffraction method is present on the particle surface.

2. The particulate positive electrode active material for a lithium secondary cell according to claim 1, wherein the fluorine atoms are unevenly distributed within 100 nm from the particle surface, and the element M atoms are unevenly distributed within 100 nm from the particle surface.

3. The particulate positive electrode active material for a lithium secondary cell according to claim 2, wherein the element M is tetravalent, the ion radius is from 0.1 to 0.9 Å.

4. The particulate positive electrode active material for a lithium secondary cell according to claim 1, wherein at least a part of the fluorine atoms is a solid solution replaced with oxygen atoms in the interior of the particles, and at least a part of the element M atoms is a solid solution which replaces cobalt atoms in the interior of the particles.

5. The particulate positive electrode active material for a lithium secondary cell according to claim 4, wherein the element M is tetravalent, the ion radius is from 0.1 to 0.9 Å.

6. The particulate positive electrode active material for a lithium secondary cell according to claim 1, wherein the element M is at least one member selected from Zr, Ti, V, Nb, Ge, Sn, Al, In, Y, Mo, W, Ga, Mg, Cr, Mn and Fe.

7. The particulate positive electrode active material for a lithium secondary cell according to claim 6, wherein the element M is tetravalent, the ion radius is from 0.1 to 0.9 Å.

8. The particulate positive electrode active material for a lithium secondary cell according to claim 1, wherein when the element M is bivalent, trivalent or tetravalent, the ion radius is from 0.3 to 0.9 Å.

9. The particulate positive electrode active material for a lithium secondary cell according to claim 1, wherein the element M is tetravalent, the ion radius is from 0.1 to 0.9 Å.

10. A lithium secondary cell comprising, the particulate positive electrode active material as claimed in claim 9.

11. A lithium secondary cell comprising, the particulate positive electrode active material as claimed in claim 1.

12. A process for producing the particulate positive electrode active material for a lithium secondary cell as defined in claim 1, which comprises firing a mixture of at least one member selected from an element M-containing oxide, an element M-containing hydroxide and an element M-containing oxyhydroxide, lithium fluoride, and cobalt hydroxide, cobalt oxyhydroxide or cobalt oxide, and lithium carbonate, at from 600 to 1050° C. in an oxygen-containing atmosphere for from 1 to 48 hours.

13. A process for producing the particulate positive electrode active material for a lithium secondary cell as defined in claim 1, which comprises firing a mixture of an element M-containing fluoride, and cobalt hydroxide, cobalt oxyhydroxide or cobalt oxide, and lithium carbonate, at from 600 to 1050° C. in an oxygen-containing atmosphere for from 1 to 48 hours.

14. A process for producing the particulate positive electrode active material for a lithium secondary cell as defined in claim 1, which comprises firing a mixture of at least one member selected from an element M-containing oxide, an element M-containing hydroxide element, an M-containing oxyhydroxide and an M-containing fluoride, lithium fluoride (except for a case where an element M-containing fluoride is used), cobalt hydroxide and/or cobalt oxyhydroxide formed by agglomeration of a large number of primary particles, and lithium carbonate, at from 600 to 1050° C. in an oxygen-containing atmosphere for from 1 to 48 hours.

* * * * *